United States Patent [19]

Yamada et al.

[11] Patent Number: 4,648,607
[45] Date of Patent: Mar. 10, 1987

[54] STEEL LAMINATE GASKET WITH ASSEMBLY ORDER IDENTIFICATION DEVICE

[75] Inventors: Yoshio Yamada, Koshigaya; Hidetaka Nakasone, Omiya, both of Japan

[73] Assignee: Ishikawa Gasket Co. Ltd., Tokyo, Japan

[21] Appl. No.: 836,030

[22] Filed: Mar. 4, 1986

[51] Int. Cl.⁴ ............................................. F16J 15/08
[52] U.S. Cl. ................................... 277/235 B; 277/2; 277/9; 277/234; 277/237 R
[58] Field of Search ................. 277/2, 9, 11, 233, 234, 277/235 R, 235 B, 236, 237

[56] References Cited

U.S. PATENT DOCUMENTS

| | | | |
|---|---|---|---|
| 2,034,610 | 3/1936 | Dickson | 277/235 B |
| 2,089,254 | 8/1937 | Fitzgerald | 277/235 B |
| 2,722,043 | 11/1955 | Nenzell | 277/9 X |
| 3,346,265 | 10/1967 | Rhoads et al. | 277/237 X |
| 4,157,833 | 6/1979 | Kozlowski | 277/9 |
| 4,326,907 | 4/1982 | Bornefeld et al. | 277/2 X |

FOREIGN PATENT DOCUMENTS 684106 3/1930 France ........................ 277/215

*Primary Examiner*—Robert S. Ward
*Attorney, Agent, or Firm*—Frank J. Jordan; C. Bruce Hamburg; Manabu Kanesaka

[57] ABSTRACT

A steel laminate gasket comprises a plurality of thin steel plates to be stacked one after another, and devices for identifying the position of the steel plates formed on the steel plates where no sealing ability is affected. When the steel plates are stacked in the proper order, the devices form a stepped portion with different height relative to a predetermined horizontal plane of the gasket. Consequently, a user can notice the proper order of assembly of the gasket.

6 Claims, 12 Drawing Figures

STEEL LAMINATE GASKET WITH ASSEMBLY ORDER IDENTIFICATION DEVICE

FIELD OF THE INVENTION AND RELATED ART STATEMENT

The present invention relates to a steel laminate gasket with an assembly order identification device. In particular, in accordance with the present invention, the order of assembly of a plurality of steel plates forming a steel laminate gasket can be easily identified by the contour thereof when the steel plates are assembled together, so that incorrect assembly of the steel plates can be prevented.

A steel laminte gasket is formed of a plurality of thin steel plates which are assembled in a specific order and connected together. The steel plates have generally the same configuration. Therefore, heretofore, a number is put on an outer surface of each steel plate to identify the specific order of assembly of the steel plates. Consequently, the steel plates can be stacked in a specific order. However, once the steel plates are assembled, it is almost impossible to check the order of assembly of the steel plates. In this respect, if the order of assembly of the steel plates is wrong, the steel laminate gasket does not seal properly to cause serious trouble.

Accordingly, one object of the present invention is to provide a steel laminate gasket in which the order of assembly of thin steel plates can be easily checked when the steel laminate gasket is formed, to thereby prevent incorrect assembly of the steel plates.

Another object of the present invention is to provide a steel laminate gasket as explained above, in which the order of assembly of thin steel plates can be easily found by checking the outside configuration of the gasket.

Further objects and advantages of the invention will be apparent from the following description of the invention.

SUMMARY OF THE INVENTION

A steel laminate gasket of the present invention is situated between two engine parts of an internal combustion engine. The steel laminate gasket comprises a plurality of thin steel plates to be stacked one after another, and means for identifying the position of the steel plates formed on the respective steel plates. When the steel plates are stacked in the proper order, the means for identifying the position of the steel plates form a stepped portion with different height relative to a predetermined horizontal plane of the gasket to thereby allow a user to notice the proper order of assembly of the gasket.

The means for identifying the position of the steel plates may be projections extending horizontally outwardly from the thin steel plates so that even after the gasket is installed in the engine, the order of assembly of the thin steel plates can be checked. The means for identifying the position of the steel plates may be notches extending inwardly from outer peripheries of the thin steel plates. Similarly, the means for identifying the position of the steel plates may be holes formed inside the steel plates.

DETAILED DESCRIPTION OF PREFERRED EMBODIMENTS

Figure 1:
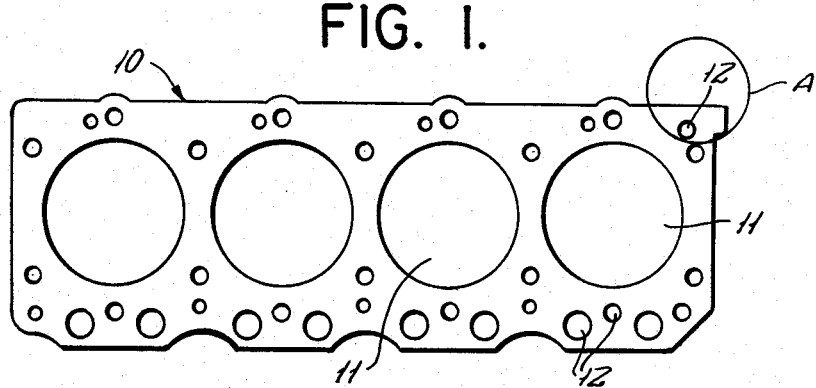
FIG. 1 is a plan view of a steel laminate gasket of the present invention.
Figure 2:
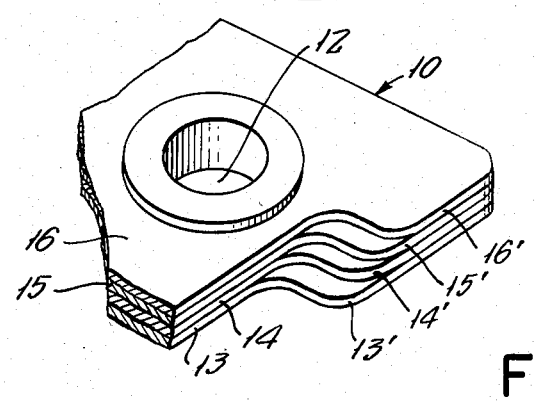
FIG. 2 is an enlarged perspective view of a portion A in FIG. 1.

Referring to FIGS. 1 and 2, a steel laminate gasket 10 to be used as a cylinder head gasket is shown. The steel laminate gasket 10 is provided with four large holes 11 and a plurality of small holes 12. Pistons (not shown) reciprocate through the large holes 11, and fluid, bolts and the like (not shown) pass through the small holes 12. The holes 11, 12 are immaterial in the present invention, so they are not explained further in this specification.

As clearly shown in FIG. 2, the steel laminate gasket 10 comprises four thin steel plates 13, 14, 15 and 16 having projections 13', 14', 15' and 16' at a corner of the rectangular gasket 10. The size of the projections 13', 14', 15' and 16' are different, wherein the projection 13' at the bottom of the gasket 10 is the largest and the projections 14', 15' and 16' become smaller, in turn. Consequently, when the steel plates 13, 14, 15 and 16 are stacked in the proper order, the projections 13', 14', 15' and 16' form a stepped wall successively and diagonally extending along the projections.

Since the projections extend outwardly from the thin steel plates when the thin steel plates are stacked together, whether the thin steel plates can be assembled correctly can be checked by inspecting the contour of the projections. Incorrect assembly order, excess or shortness of plates can be easily discovered to thereby prevent incorrect assembly of the thin steel plates.

Figure 3:
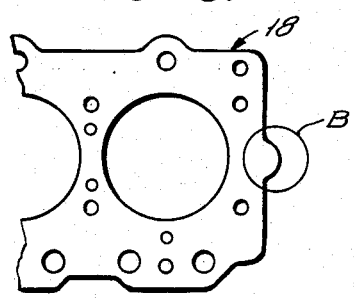
FIG. 3 is a plan view of a part of a second embodiment of a steel laminate gasket.
Figure 4:
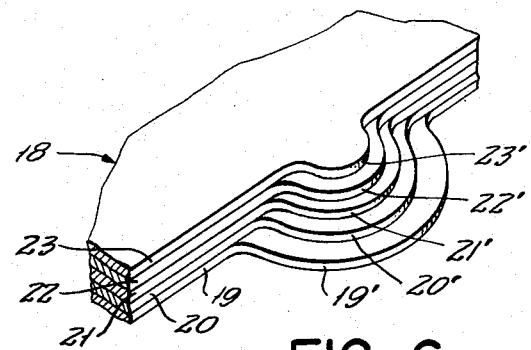
FIG. 4 is an enlarged perspective view of a portion B in FIG. 3.

FIGS. 3 and 4 show a second embodiment of a steel laminate gasket 18. The steel laminate gasket 18 comprises five thin steel plates 19, 20, 21, 22 and 23 having projections 19', 20', 21', 22' and 23', respectively. The projections are formed in the middle of a side portion of the steel laminate gasket 18. When the thin steel plates are stacked properly, the projections align in order from the largest projection 19' to the smallest projection 23'. Accordingly, the position of the thin steel plates can be easily checked by inspection of the projections.

Figure 5:
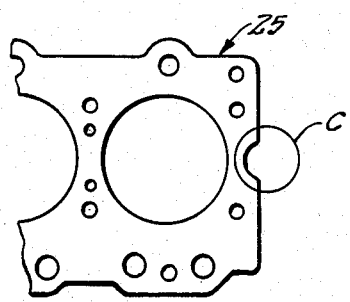
FIG. 5 is a plan view of a part of a third embodiment of a steel laminate gasket.
Figure 6:
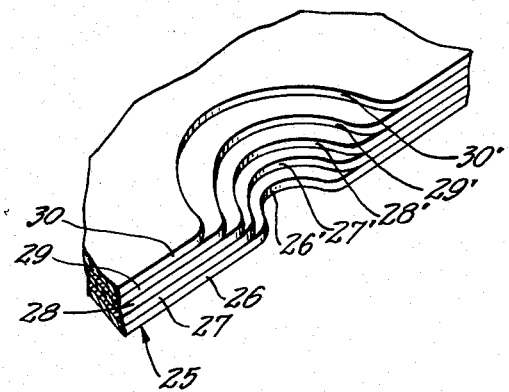
FIG. 6 is an enlarged perspective view of a portion C in FIG. 5.
Figure 7:
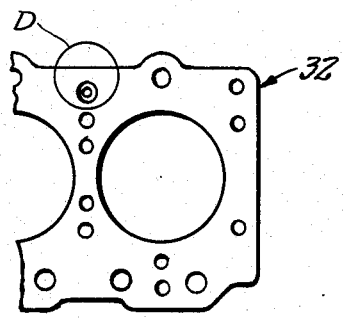
FIG. 7 is a plan view of a part of a fourth embodiment of a steel laminate gasket.
Figure 8:
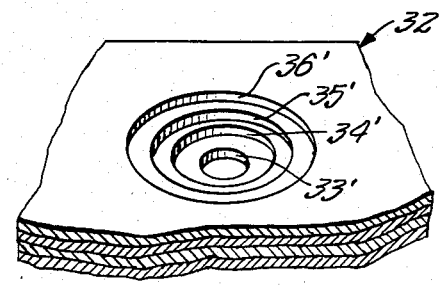
FIG. 8 is an enlarged perspective view of a portion D in FIG. 7.

FIGS. 5 and 6 show a third embodiment of a steel laminate gasket 25. The steel laminate gasket 25 comprises five thin steel plates 26, 27, 28, 29 and 30 having notches 26', 27', 28', 29' and 30', respectively, which are different in size. The notches are formed in the middle of a side portion of the steel laminate gasket 25. When the thin steel plates are stacked properly, the notches align in order from the smallest notch 26' to the largest notch 30'. Accordingly, the position of the thin steel plates can be easily checked by inspection of the notches. When the gasket 25 is installed between two engine parts, the notches are located inside the engine parts. Therefore, installation of parts to the engine is not affected at all.

Figure 9:
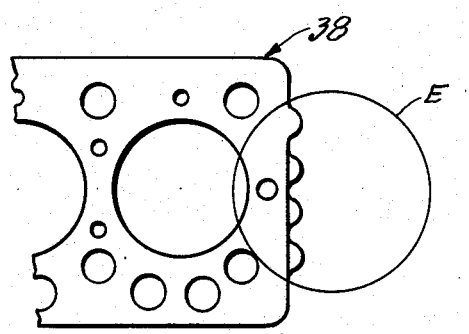
FIG. 9 is a plan view of a part of a fifth embodiment of a steel laminate gasket.
Figure 10:
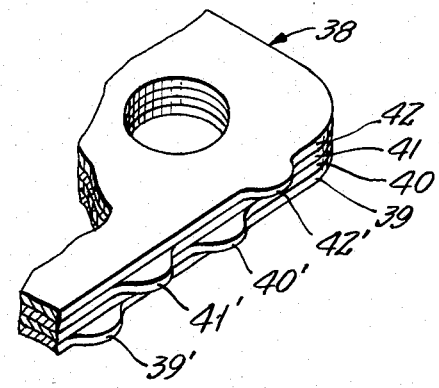
FIG. 10 is an enlarged perspective view of a portion E in FIG. 9.

FIGS. 9 and 10 show a fifth embodiment of a steel laminate gasket 38, which comprises four thin steel plates 39, 40, 41 and 42 having projections 39', 40', 41' and 42', respectively. When the thin steel plates are stacked properly, the projections align in predetermined order and form. Accordingly, the position of the thin steel plates can be easily checked by inspection of the projections.

Figure 11:
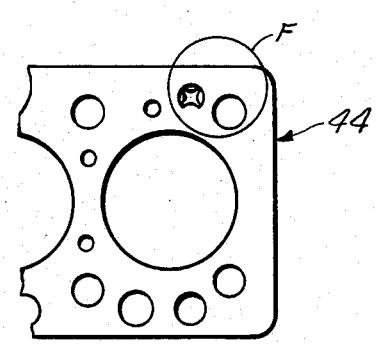
FIG. 11 is a plan view of a part of a sixth embodiment of a steel laminate gasket.
Figure 12:
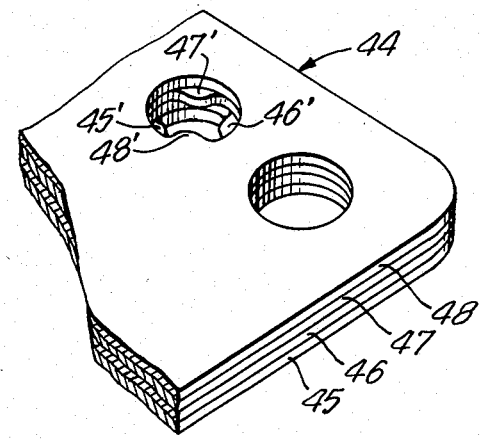
FIG. 12 is an enlarged perspective view of a portion F in FIG. 11.

FIGS. 11 and 12 show a sixth embodiment of a steel laminate gasket 44. The steel laminate gasket 44 comprises four thin steel plates 45, 46, 47 and 48 with holes respectively, which include projections 45', 46', 47' and 48' extending into the holes at different positions. When the thin steel plates are stacked properly, the projections align in the holes at a specific order. Accordingly, the position of the thin steel plates can be easily checked by inspection of the projections.

In the embodiments as explained above, projections or portions around the notches and holes for identifying the position of the steel plates may be painted with different colors. Consequently, the order of assembly of the steel plates can be easily identified.

In the present invention, an identification section is, at first, selected in a steel laminate gasket, wherein sealing ability is not affected. In the identification section, stepped wall is fomred so that the order of assembly of the thin steel plates can be easily recognized by checking the contour of the stepped wall, even after assembling the thin steel plates. Accordingly, incorrect assembly of the thin steel plates can be prevented to thereby provide a steel laminate gasket of good quality.

While the invention has been explained with reference to the specific embodiments of the invention, explanation is illustrative and the invention is limited only by the appended claims.

What is claimed is:

1. A steel laminate gasket adapted to be situated between two engine parts of an internal combustion engine, comprising
   a plurality of thin steel plates to be stacked one after another, and
   means for identifying position of the steel plates formed on the steel plates where sealing ability is not affected, said means, when the steel plates are stacked in a proper order, forming a stepped portion with different height relative to a predetermined horizontal plane of the gasket to thereby allow a user to notice the proper order of assembly of the gasket.

2. A steel laminate gasket according to claim 1, in which said means for identifying position of the steel plates forms a stepped wall successively diagonally extending relative to a horizontal plane of the steel plates.

3. A steel laminate gasket according to claim 2, in which said means for identifying position of the steel plates are projections extending horizontally outwardly from the thin steel plates so that even after the gasket is installed in the engine, the order of assembly of the thin steel plates can be checked.

4. A steel laminate gasket according to claim 2, in which said means for identifying position of the steel plates are notches extending inwardly from outer peripheries of the thin steel plates.

5. A steel laminate gasket according to claim 2, in which said means for identifying position of the steel plates are holes formed inside the steel plates.

6. A steel laminate gasket according to claim 1, in which said means for identifying position of the steel plates formed on the steel plates are painted with different colors.

* * * * *